United States Patent [19]
Sattar et al.

[11] Patent Number: 5,644,631
[45] Date of Patent: *Jul. 1, 1997

[54] METHOD AND APPARATUS FOR DELIVERING CALLING SERVICES

[75] Inventors: Sohail Sattar; Steven E. Polsky, both of Irving, Tex.

[73] Assignee: InterVoice, Inc., Dallas, Tex.

[*] Notice: The term of this patent shall not extend beyond the expiration date of Pat. No. 5,469,500.

[21] Appl. No.: 689,281

[22] Filed: Aug. 6, 1996

Related U.S. Application Data

[63] Continuation of Ser. No. 508,392, Jul. 31, 1995, Pat. No. 5,572,581, which is a continuation of Ser. No. 151,543, Nov. 12, 1993, Pat. No. 5,469,500.

[51] Int. Cl.[6] .................................................. H04M 3/42
[52] U.S. Cl. .......................... 379/201; 379/207; 379/211; 379/212; 379/229
[58] Field of Search .................................. 379/201, 207, 379/211, 212, 210, 229, 265, 266, 221, 67, 88, 89, 142, 230

[56] References Cited

U.S. PATENT DOCUMENTS

| | | | |
|---|---|---|---|
| 4,878,240 | 10/1989 | Lin et al. | 379/67 |
| 4,979,118 | 12/1990 | Kheradpir | 364/436 |
| 5,136,631 | 8/1992 | Einhorn et al. | 379/67 |
| 5,222,125 | 6/1993 | Creswell et al. | 379/67 |
| 5,243,643 | 9/1993 | Sattar et al. | 379/88 |
| 5,323,452 | 6/1994 | Dickman et al. | 379/201 |
| 5,365,582 | 11/1994 | Yamada et al. | 379/265 |
| 5,526,415 | 6/1996 | Wakamoto | 379/202 |

*Primary Examiner*—Krista M. Zele
*Assistant Examiner*—Scott Wolinsky
*Attorney, Agent, or Firm*—Fulbright & Jaworski L.L.P.

[57] ABSTRACT

A call processor (49) contains a service node/intelligent peripheral service creation environment (58) to create a service logic table (56) to store call processing instructions. A service logic executive (54) accesses the service logic table (56) and executes the call processing instructions in response to a received data package. Call processor (49) can operate in slave mode to provide call processing resources to a service control point or in autonomous mode to deliver a specific calling service, such as voice mail.

27 Claims, 2 Drawing Sheets

METHOD AND APPARATUS FOR DELIVERING CALLING SERVICES

This a continuation of application Ser. No. 08/508,392 filed Jul. 31,1995, now U.S. Pat. No. 5,572,581, which is a continuation of application Ser. No. 08/151,543 filed Nov. 12, 1993, now U.S. Pat. No. 5,469,500.

TECHNICAL FIELD OF THE INVENTION

The invention relates in general to systems and methods for performing call processing, and more particularly to systems and methods for delivering calling services.

BACKGROUND OF THE INVENTION

Computer-based telecommunications systems have proliferated in the last few years, in part due to the proliferation of high-speed personal computers and low cost equipment now available. When combined with high-speed telephone switching lines, these systems have exhibited rapid advancements in technology and versatility. One of these advancements is the delivery of calling services. These new services range from familiar voice processing services, such as voice mail and interactive voice response, to other advanced services like flexible call forwarding, text-to-voice prompting, and voice recognition. Management and delivery of calling services is collectively referred to as call processing.

Large telephone companies now realize the potential of delivering calling services to a wider population and have begun to offer more services. Many local carriers currently offer call waiting, call forwarding, and voice mail. Most long distance companies also offer calling services, often through their 800 number services. In addition, the rapid advancements in telephony and heightened consumer demand for calling services have spurred the companies who own telephone switches and networks to design and implement new and more sophisticated services.

Telephone service providers rely on switch vendors (such as AT&T and Northern Telecom) to introduce new services through modifications at the switch level. This presents several problems. For example, switch modifications lengthen turnaround time for introducing new services because the local carrier must rely on the switch vendors to update the switch and roll out new services. When the switch vendors finally decide to introduce a new service, the introduction is normally on a national scale, decreasing any chance for differentiation and competition for new services at the local level. In addition, switch manufacturers must rewrite the software that controls the switches to introduce new calling services, further exacerbating the problems of difficult modification and slow introduction of new services.

In response, the industry developed a next generation network design called Advanced Intelligent Network (AIN) architecture. Instead of lumping all calling services into the switch, AIN architecture groups intelligence into peripheral computer systems that can more effectively and efficiently deliver calling services. The concept is to maintain the existing network of generic switches that perform call connection, but to transfer "intelligent" operations to peripheral computers. In such a manner, relatively inexpensive peripheral computers can provide more flexible and efficient call processing.

In managing and delivering calling services, these call processing computers perform a wide variety of functions, ranging from providing simple tasks or resources to managing the overall delivery of calling services. The term call processor refers to any device that executes functions necessary to deliver calling services.

The call processing of 800 calls is a simple example of how a precursor to the AIN concept operates. When a caller places an 800 call, the local switch that receives the call recognizes the number as a special call and defers to an external device for information on how to route the call. The external device is a database containing all of the 800 numbers, and the switch sends a data message to the database requesting routing information. The database performs a lookup to translate the 800 number dialed by the caller into a traditional ten digit number containing an area code and prefix, and sends the translated number to the switch. The switch then routes the call Using the traditional ten digit number. AT&T and other long distance carriers maintain the continually changing 800 number database in central locations. By setting up one or only a few databases, any changes in 800 number service can be made simply and efficiently without having to reprogram every switch each time the database changes. The concept of the switch deferring to a peripheral device to determine how to route the call, rather than relying on its hard-coded logic, is typical of a precursor to the AIN architecture.

The concept of AIN, however, has evolved, and thus takes on several definitions. Early attempts to deliver calling services, termed hybrid AIN architecture, off-load a portion of the switch intelligence, but still require the switch to maintain direct control over call management. The 800 number service is typical of this early architecture, where the switch does not relinquish control over the call but requests data from a central database.

Current AIN architecture delivers calling services through use of service control points (SCPs). An SCP receives a data package from the switch when the switch requires assistance in routing the call or providing a calling feature. Thus, the intelligence to process calls is off-loaded from the switch to the SCP. Local carriers can design and release new calling services by modifying the SCP software, which provides an advantage over the hybrid AIN architecture. The SCP, rather than the switch, assumes control over call processing.

The SCP in the current AIN architecture receives data packages from the switch and manages call processing. The SCP also delegates many of the tasks of call processing to "intelligent" peripherals (IPs). IPs provide a variety of resources, such as voice prompting, digit collecting, and voice recognition, while operating as slave processors to the SCP. The SCP defers a small portion of the call processing to an IP, but immediately regains control of the call after the IP executes a simple task.

A current AIN architecture may also include a service node (SN), which is a stand-alone platform that autonomously delivers calling services. An SN is connected to the switch and dedicated to deliver a particular calling service, such as voice mail, automated attendant, or fax server functions. Unlike the IP which operates as a slave to the SCP, the SN operates for the most part autonomously. The telecommunications switch actually patches the call to the SN and the SN processes the call autonomously without much direction from the switch or the SCP. Therefore, AIN architecture currently supports using both a dedicated SN for autonomously delivering a particular calling service and an SCP with access to the resources of an IP for managing delivery of calling services.

Thus, the current landscape of call processing at the local carrier level continues to evolve, with several variations in existence. Consequently, a need has arisen for a system that is compatible with current and unsettled industry standards, and yet easily modifiable and reconfigurable to meet the future specifications of switch manufacturers, local carriers, and their customers.

SUMMARY OF THE INVENTION

In accordance with the present invention, a method and apparatus for delivering calling services are provided which substantially eliminate or reduce the disadvantages and problems associated with prior systems that deliver calling services.

The present invention contemplates call processing and a call processor that autonomously deliver specific calling services while also providing call processing resources to SCPs and other switch technology.

In accordance with one aspect of the invention a call processor delivers calling services to callers. The call processor includes a service creation environment to create a service logic table for storing call processing instructions. The call processor also includes a service logic executive with access to the service logic table for executing the call processing instructions. In addition, a communications link allows transmission of a data package to the call processor. When the call processor receives the data package, the service logic executive accesses the service logic table and executes the call processing instructions responsive to the data package.

More specifically, the service creation environment allows manipulation of vectors, objects, and events to construct the call processing instructions. In a further embodiment, the service creation environment comprises a graphical interface that allows manipulation of the vectors, objects, and events to create a visual representation of call processing instructions.

In accordance with another aspect of the present invention a method is disclosed for delivering a calling service to a caller. The method first generates call processing instructions. The next step receives a data package at a call processor. The method then executes the call processing instructions in response to the data package.

In accordance with another aspect of the present invention a call processing architecture is disclosed for delivering calling services to callers. A call processor executes a service logic table generated by a service creation environment. The call processing architecture also contains external information sources coupled with distinct and modular servers for connecting the call processor to the external information sources. The servers provide information to the call processor for delivering a calling service. In addition, the servers operate independently from the call processor and are reconfigurable without effecting the functionality of the call processor.

A technical advantage of the present invention is call processing that is easily modifiable and reconfigurable to function with a variety of existing telecommunications technology.

Another technical advantage of the present invention is call processing that is compatible with current and unsettled call processing industry standards.

Another technical advantage of the present invention is a call processor operable to provide call processing resources to a service control point while also operable to provide a specific calling service, such as voice mail.

Another technical advantage of the present invention is a graphical service creation environment that allows manipulation of vectors, objects, and events to construct a visual representation of call processing instructions.

Another technical advantage of the present invention is call processing that allows development and delivery of new calling services without interruption of existing service and without modification of call processor software.

Another technical advantage of the present invention is a call processing architecture containing a plurality of distinct and modular servers operating independently from the call processor and reconfigurable without affecting the functionality of the call processor.

Another technical advantage of the present invention is a call processing resources architecture that is dynamically configurable to allow for the creation of new resources or modifications of existing resources by combining existing resources or creating new ones and arranging them to form virtual resources.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
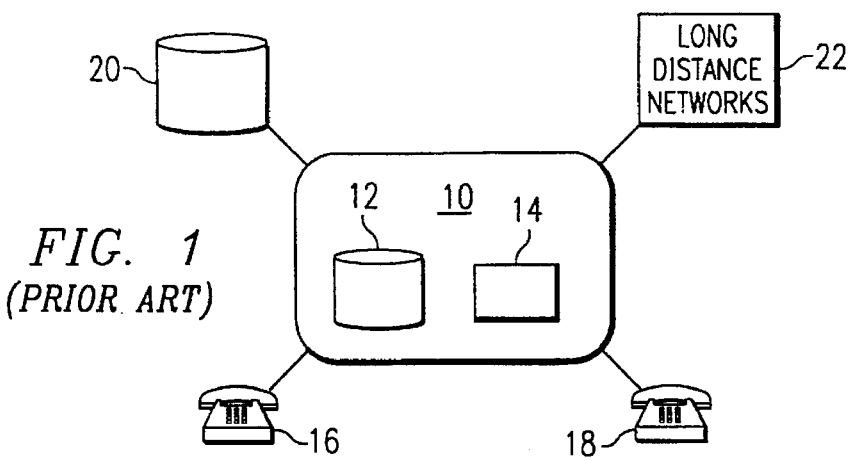
FIG. 1 is a block diagram of the major elements of a hybrid precursor to the AIN architecture.

FIG. 1 represents operation of a telecommunications switch 10 that is not under the control of a service control point (SCP). Switch 10 is a generic telecommunications switch for routing calls, such as those manufactured by switch suppliers AT&T, Northern Telecom, and others. Switch 10 is typically installed in a local carrier system that receives and routes calls of local customers.

Switch 10 contains a switch database 12 that stores customer profile information that may contain a list of specialized services or long-distance carriers. For example, switch database 12 may contain information indexed by phone number showing that a customer currently subscribes to call waiting and uses MCI as a long-distance carrier. Switch 10 also contains hard code 14 that manages the operation of the switch. Hard code 14 comprises programming steps, written in C or any suitable programming language, that are designed to specifically control the operation of switch 10. This software varies in complexity depending on the functionality of the switch and requires modification to add new capabilities to switch 10. Therefore, a new version of hard code 14 is required to introduce a new calling service.

A simple cross-matrix switch that provides few calling services may simply receive calls from a calling party 16, access the customer profile information in switch database 12, and route the call based on this information to a called party 18. This would be the typical operation of switch 10 in routing a local call.

Switch 10 in FIG. 1 can also perform calling services such as call waiting, and can route long-distance numbers to the proper long-distance carrier by accessing local customer profile information in switch database 12. For example, call waiting may be initiated at switch 10 when calling party 16 places a call and then receives another incoming call. Switch 10 accesses the customer profile information in switch database 12 to determine that calling party 16 subscribes to the call waiting service. If calling party 16 subscribes to call waiting, then switch 10 sends the characteristic call waiting tone to calling party 16. Similarly, for a long-distance call, switch 10 accesses the customer profile information in switch database 12 to determine the proper long-distance network 22 to route the call through. For both call waiting and routing of long-distance calls, switch 10 accesses switch database 12 to process the call without consulting or transferring control to a peripheral device. This is the typical operation of a telecommunications switch performing simple call processing with little or no Advanced Intelligent Network (AIN) architecture.

Hard code 14 may also direct switch 10 to deliver more advanced services using a hybrid AIN architecture. For example, hard code 14 may direct switch 10 to issue a trigger when it cannot effectively route a call without outside help. A data package requesting help in placing the call or performing the calling service is then sent to a peripheral device outside switch 10. A peripheral device can be any call processor, such as a service control point (SCP), service node (SN), intelligent peripheral (IP), customer profile database, long distance call router, or any other suitable device.

For example, switch 10 accesses a peripheral device when calling party 16 wishes to place an 800 call. In such a case, calling party 16 goes off hook, and this action itself may generate a trigger within the switch to activate a dual tone multifrequency (DTMF) decoder. The DTMF decoder resource can reside in the switch or in a peripheral device accessible by the switch. Calling party 16 then dials the digits of the 800 number and switch 10 decodes the 800 number and issues a data package requesting assistance from translator database 20 to place the call. Translator database 20 is typically located at a remote location and maintains a list of 800 numbers and a corresponding routing numbers used to place a call. For example, the number 1-800-123-4567 may be assigned to called party 18, a company located in Dallas, Tex. If the call was routed by the 800 number, then all the switches in the nation would have to maintain information on how to route the call. Instead, translator database 20 maintains this list in a central location and sends switch 10 a ten digit number for routing the call using the established network of area codes and prefixes. In this example, the 800 number dialed by calling party 16 may be translated to (214) 555-1234 and switch 10 would then understand how to route this call to called party 18 in Dallas, Tex.

By off-loading some of the intelligence of switch 10 to a central location, in this example the translation of all 800 numbers, switch 10 becomes less intelligent and more reliant on peripheral devices to process a call. However, switch 10 only establishes a data communication with translator database 20 and does not open a voice line or route the call to the peripheral device. Furthermore, switch 10 independently recognizes the 800 number, generates a trigger, and directly accesses a particular database for information on how to route the call. Switch 10 does not relinquish control over the call. This hybrid AIN architecture transfers some of the intelligence from the switch to other peripheral devices but does not use a service control point or other separate peripheral devices to maintain and design new services.

The foregoing discussion of FIG. 1 describes a simple switch capable of routing local, 800, and long-distance calls and performing simple calling services such as call waiting. In such a system, any calling services provided to customers by the local carrier require modification of lines of hard code 14 within switch 10. This system, therefore, presents difficulties since a new version of hard code 14 must be installed for each new service.

Figure 2:
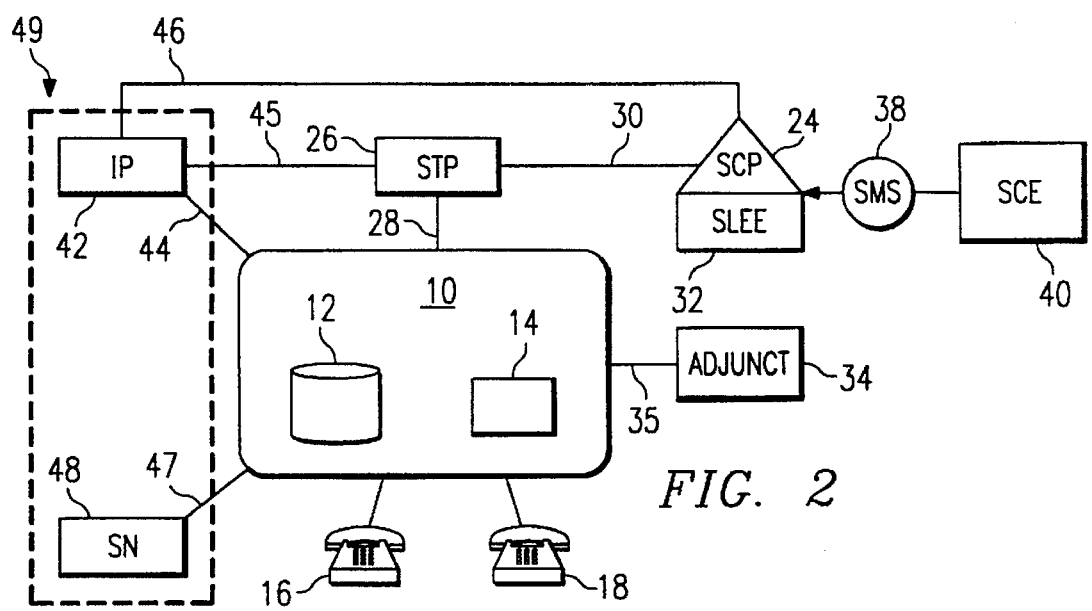
FIG. 2 is a block diagram of the major elements of a current AIN architecture.

FIG. 2 represents AIN architecture which utilizes a service control point (SCP) to manage calling services. The present invention, which will be discussed in detail in connection with FIGS. 3-5, relates to call processor 49, shown functionally by the dashed lines, for delivering calling services in the general architecture of FIG. 2.

In the architecture of FIG. 2, switch 10 contains switch database 12 and hard code 14, but at least some switch intelligence and management functions are off-loaded to SCP 24. Switch database 12 may still store customer profile information to facilitate call routing and delivery of simple calling services. Hard code 14 includes a call model with a list of switch trigger points. Upon certain trigger events switch 10 sends a data package to SCP 24 to request aid in processing the call. The data package is transferred from switch 10 to a signal transfer point (STP) 26 along an SS7 data line 28. STP 26 connects switch 10 to a local or nationwide SS7 data network that facilitates efficient processing of calls. STP 26 passes the data package to SCP 24 via SS7 data line 30. SCP 24 supports data communications over SS7 data line 30, but does not support voice communications.

Upon receipt of the data package from switch 10, SCP 24 processes the call using a service logic execution environment (SLEE) 32. SCP 24 is traditionally a reliable, fault tolerant computer, such as those manufactured by Tandem or Sequoia. SLEE 32 software runs on SCP 24 which manages and delivers calling services in response to data packages received by switch 10.

Also shown in FIG. 2 is adjunct 34, directly connected to switch 10 through data line 35, which may support both data and voice communications. Adjunct 34 provides simple call processing functions to switch 10, such as the lookup feature for 800 number translation described with reference to FIG. 1.

SCP 24 is connected to a service management system (SMS) 38 which is a provisioning system that controls the introduction of new calling services. SMS 38 receives modifications to SLEE 32 from a service creation environment (SCE) 40. Therefore, in this AIN architecture new calling services are introduced by modifying the control software or SLEE 32 of SCP 24.

In operation, network administrators design new calling services on SCE 40, which are transferred to SMS 38 for provisioning on SCP 24. Switch 10 issues data packages upon certain trigger events. SCP 24 responds to these data packages and manages the call processing based on the current version of SLEE 32.

Also shown in FIG. 2 is intelligent peripheral (IP) 42 connected to switch 10 along voice and data link 44 using an Integrated Services Data Network (ISDN) link or other appropriate voice and data communications protocol and hardware. IP 42 may also be connected to STP 26 along data link 45, and SCP 24 along data link 46. Therefore, SCP 24 and IP 42 may communicate directly using data link 46 or indirectly through data link 30, STP 26, and data link 45. Alternatively, data communication between SCP 24 and IP 42 may be routed through switch 10 using voice and data link 44, data link 28, STP 26, and data link 30. Data links 28, 30 and 45 are preferably tied into the local or nationwide SS7 network through STP 26. It is understood, however, that these data links can accomplish data communication using any suitable protocol and hardware, including, but not limited to: transmission control protocol/Internet protocol (TCP/IP), fiber digital data interface (FDDI), and synchronous protocol X.25. Similarly, data link 46 can be SS7, TCP/IP, FDDI, X.25, or any other synchronous or asynchronous data link. It should be understood that the listing of various communications links is exemplary only, and more or less than all the links shown may be used.

IP 42 is dependent on SCP 24 for its instructions. In operation, SCP 24 sends a data package to IP 42 along any of the possible communication links described above. IP 42 then responds to the data package by executing a simple call processing resource, such as DTMF decoding or voice synthesis. After performing the simple task, IP 42 transmits a data package back to SCP 24 indicating completion of the resource. At all times, SCP 24 maintains control over the call and directs IP 42 to perform certain call processing resources not supported by SCP 24.

IP 42, unlike SCP 24, supports voice as well as data communications. For example, IP 42 can transmit and receive voice to and from switch 10 over link 44. Therefore, IP 42 may offer SCP 24 the resources to play announcements to a party, collect digits, or recognize voice, among other things, over link 44.

Call processing of a new service will illustrate the master-slave relationship between SCP 24 and IP 42. The new service, called important person prompting, is similar to call waiting, but instead of using the characteristic call waiting tone, the customer receives the spoken name of particular parties waiting to be connected. This service allows the customer to receive the identity of the party before accepting a second call. To set up this service, the names and numbers of the "important persons" will be input to SCP 24.

To initiate important person prompting, calling party 16 places a call to called party 18. When switch 10 receives another call destined for calling party 16, switch 10 accesses the customer profile of calling party 16 from switch database 12 and realizes that calling party 16 subscribes to important person prompting. Switch 10 then sends a data package to SCP 24 through STP 26. Alternatively, switch 10 may issue a data package to SCP 24 requesting aid, and SCP 24 can determine that calling party 16 subscribes to important person prompting. SCP 24, which is running SLEE 32, then processes the call by sending IP 42 a data package containing a request to play the name of the listed important person attempting to call. This data package can be sent from SCP 24 to IP 42 using any of the possible communications links described above. IP 42, in this example, includes a voice synthesis resource that generates the spoken name. Thus, the data package sent to IP 42 may contain the letters of the "important person's" name. SCP 24 also sends a data package to switch 10 to open a voice channel on link 44 between IP 42 and switch 10 for the announcement.

Thus, IP 42 responds to a resource request from SCP 24, in this case a text-to-voice operation, and acts as a slave of SCP 24 in delivering the requested resource. Using this architecture, IP 42 may perform several different functions including voice recognition, fax retrieval and reporting functions, digit collection, and text-to-voice functions, among other functions. In delivering these resources, IP 42 depends on SCP 24 to initiate and oversee the call processing.

Also shown in FIG. 2 is service node (SN) 48 connected directly to switch 10 through voice and data link 47 using ISDN or other appropriate voice and data communications protocol and hardware. SN 48 performs a specific call processing function autonomously. For example, SN 48 may support voice mail in the following manner. Switch 10 generates a data package representing a request for voice mail made by a caller. Alternatively, SCP 24 may directly receive the request from the caller or independently determine that the caller desires to access voice mail. SCP 24 sends a data package requesting switch 10 to access SN 48 to perform the voice mail function. SCP 24 could also send the data package directly to SN 48. SN 48 then delivers the voice mail service without additional help from SCP 24 or switch 10. SN 48, therefore, performs a narrow but autonomous call processing function. Call processor 49 of the present invention, shown functionally by the dashed lines in FIG. 2, can operate in slave mode like IP 42 to provide call processing resources to SCP 24 or in autonomous mode like SN 48 to deliver a specific calling service, such as voice mail.

Figure 3:
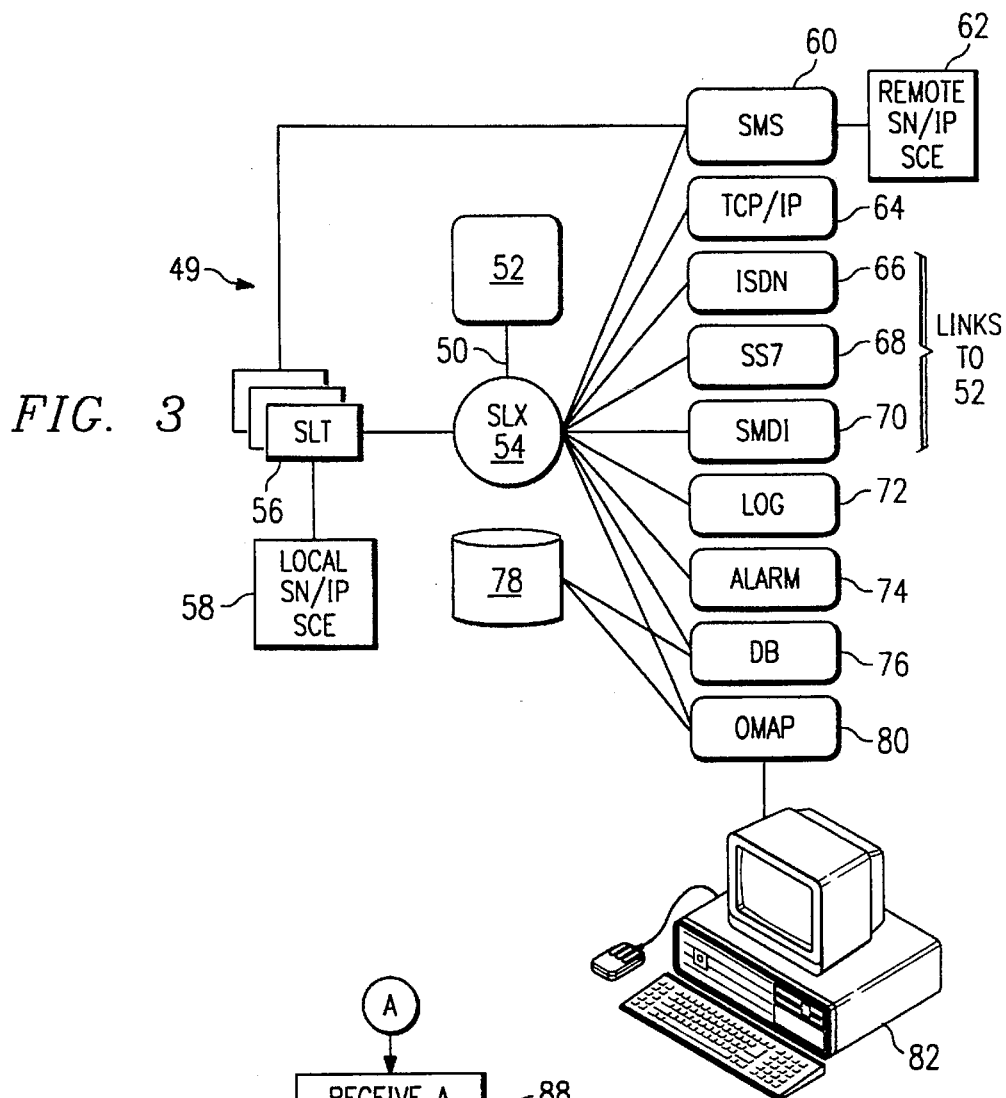
FIG. 3 is a block diagram of the major elements of a call processor constructed according to the teachings of the present invention.

FIG. 3 shows the major elements of call processor 49 capable of providing a variety of calling services with or without the direction of SCP 24. Link 50 connects the public switch telephone network 52 to service logic executive (SLX) 54 of call processor 49. Network 52 includes, for example, switch 10, SCP 24, and STP 26, among other telecommunication devices. The various components of network 52 may connect directly to SLX 54 or through a variety of servers, as described below. SLX 54 is the central processor of call processor 49 and accesses service logic tables (SLT) 56 generated from a local service node/ intelligent peripheral service creation environment (SN/IP SCE) 58. SLT 56 can be stored in random access memory (RAM), read only memory (ROM), or any suitable memory or storage device.

SLX 54 may also communicate with network 52 and other telecommunication devices, call processors, or other data processing devices through various servers. For example, a service management system (SMS) interface 60 allows updating of SLT 56 from a remote SN/IP SCE 62. TCP/IP server 64 connects SLX 54 to other devices on a local area network, which may be provided by link 46, for example. ISDN server 66 connects SLX 54 to other devices on an integrated services data network, which may be provided by links 44 and 47, for example. In addition, SS7 server 68 allows SLX 54 to connect to a local or nationwide SS7 data network, which may be provided by link 45, for example. SLX 54 may also connect to SMDI server 70 for data signaling in voice mail like applications, log server 72 for usage statistics, traffic, and billing functions, and alarm server 74 for managing and manipulating alarm sense points. Database server 76 allows SLX 54 to access database 78 and retrieve information to aid in call processing. Database 78 can be external or internal to call processor 49. Operations, maintenance, administrative and provisioning (OMAP) server 80 allows SLX 54 to connect to input/output device 82 for analyzing, monitoring, and trouble shooting. OMAP server 80 also allows access to and modification of database 78. The listing of these servers is exemplary only, and other servers may be used for various functions without departing from the intended scope of this invention.

Call processor 49 stores call processing instructions in SLT 56 to handle and route calls. The call processing instructions in SLT 56 are developed in local SN/IP SCE 58 or transferred from a remote SN/IP SCE 62 through SMS server 60. For simplicity, any subsequent reference to SN/IP SCE 58 contemplates both local and remote operation. In a particular embodiment, SN/IP SCE 58 allows development of call processing instructions for a vectored-state architecture by configuring an arrangement of vectors, objects, and events. U.S. Pat. No. 5,243,643, issued to Sattar, et al. and incorporated herein by reference, discloses use of vectors, objects, and events in developing call processing applications.

In one embodiment, SN/IP SCE 58 utilizes a graphical interface that allows manipulation of vectors, objects, and events to construct visual representations of call processing instructions. The vectors, objects, and events provide an intuitive and flexible medium for system administrators to design new call processing services. Unlike the hard code traditionally used in call processing systems, the graphical interface allows construction and modification of calling services without rewriting lines of software.

The call processing instructions generated in the SN/IP SCE 58 are downloaded to the SLT 56 for use in processing calls. As an example, one call processing instruction set may define a new service for all subscribers such as flexible call forwarding or a customized service for a particular subscriber such as a voice response service for a bank. Another call processing instruction set may define a resource, such as digit collection or voice synthesis, that can be provided to a service control point for processing calls. The present invention contemplates simultaneous storage of multiple sets of call processing instructions in SLT 56 to support a wide variety of functions performed by call processor 49. Furthermore, call processor 49 may contain one or more SLTs with each SLT maintaining one or more sets of call processing instructions.

SN/IP SCE 58 maintains a library of call processing instruction sets that may be represented by vectors, objects, and events that can be easily retrieved and combined. This modular or building block design allows efficient modification or construction of customized systems capable of performing a variety of call processing functions without rewriting the call processor software. For example, a customer may desire a call delivery system to route incoming calls to an extension, an automated attendant, or a voice mail facility, depending on the caller's preference. A system administrator can easily and quickly construct such a customized call processing system by accessing call processing instruction sets from the library for standard call delivery, automated attendant, and voice mail. The process is further simplified by graphically manipulating vectors, objects, and events representing the call processing instruction sets.

The user may define objects on a microscopic scale to perform single functions. However, objects may also be grouped to facilitate call processing operations on a higher level. Objects may be detailed, such as a spoken name contained in a voice mail application, or broad, such as an entire mailbox containing all voice and data messages, facsimiles, or electronic mail for an individual.

Similarly, the user can microscopically define vectors for a high degree of detail, while at the same time group several vectors together in order to hide unnecessary detail. For example, a detailed vector may contain call processing instructions to play a spoken name from within a voice mail application or the date and time that the message was sent, while another vector may contain call processing instructions to play only a particular desired segment of the message. An SN can access a group of detailed vectors by a single reference and command a voice mail envelope to play the entire contents in a manner determined by arrangement of the detailed vectors within the group. The present invention encompasses all such applications of objects, vectors, and events to process calls.

A call processor using vector, object, and event building blocks becomes an object-oriented, event-based system adaptable to perform any call processing functions. The building blocks of any calling service are programmed in most any programming language, such as C-language, but call service developers merely use the building blocks by reference and need not concern themselves with the details of the programming code. Therefore, calling service developers who are not fluent in scripted computer languages can develop applications quickly and provide layered multiple applications as particular needs change without having to be confined by the specifications of an earlier application and without reprogramming lines of software.

The call processing instructions are designed in SN/IP SCE 58, down-loaded into SLT 56, and run by SLX 54. The system administrator can modify SLT 56 without interrupting the functionality of SLX 54 in processing calls. Once a data package is received by call processor 49, SLX 54 accesses and executes the proper call processing instructions in SLT 56 in response to the data package. Call processor 49, therefore, can handle any call processing task and operate autonomously like a service node, but with greater flexibility and configurability, or it may make its call processing resources available to the SCP for an IP role, as will be discussed.

During development of AIN architecture, the regional telephone companies established a standard describing the exact functionality of an intelligent peripheral (IP). Technical Advisory 1129 published by Bellcore describes the current standard used in the industry for the messages an IP should understand and the resources an IP should provide to an SCP. By using call processing instructions designed in SN/IP SCE 58 and loaded in SLT 56, the present invention can be easily configured to emulate current TA 1129 standards. Furthermore, the user can easily add, remove, and modify resources. In such a manner, the present invention provides a call processing resources architecture that is dynamically configurable to allow for creation of new resources or modification of existing resources. The invention also contemplates arranging or combining existing or newly created resources to form virtual resources. Therefore, call processor 49 can operate as an autonomous and flexible service node, but can also operate in a slave mode and deliver a variety of call processing resources to an SCP.

In one embodiment, SLT 56 maintains a call processing instruction set that allows call processor 49 to emulate current TA 1129 standards of an IP. Additional call processing instruction sets designed in SN/IP SCE 58 and down-loaded to SLT 56 can provide one or more call processing tasks similar to the tasks currently provided by an autonomous SN. Therefore, call processor 49 can simultaneously maintain call processing instruction sets that provide the functionality of an IP or an SN. Call processor 49 operates both as an autonomous SN and as a slave IP and, therefore, must handle data packages from a variety of sources and properly dispatch an IP or SN functionality in response to the data package received. Referring to FIG. 2, call processor 49, shown in dashed lines, provides the dual function of IP 42 and SN 48. It is further understood that the present invention contemplates delivering the functionality of multiple IPs or multiple SNs.

The architecture of FIG. 3 allows existing SNs to be equipped with IP functionality to take advantage of new calling services introduced at SCP 24. Furthermore, by exploiting the configurability and flexibility of SN/IP SCE 58 and SLT 56, call processor 49 can provide new resources beyond those currently envisioned in Bellcore's TA 1129 standards. These new resources developed in call processor 49 will likely include more complicated and autonomous tasks that alleviate some of the processing requirements of SCP 24. Eventually, much of the functionality of SCP 24 may be downloaded to peripheral devices, and call processor 49 can adapt to these changes efficiently and effectively.

A variety of SLX servers connect to SLX 54 through local area network socket links, thereby allowing the servers to be selectively stripped off and added as call processing hardware evolves. The on-loading or off-loading of services to or from call processor 49 as AIN architecture develops will not effect the operation of SLX 54, SLT 56, or SN/IP SCE 58. Therefore, the architecture shown in FIG. 3 can easily be modified or reconfigured to meet future calling service requirements by modifying SLT 56 or modifying functions performed by existing SLX servers.

The operation of call processor 49 may also depend on the current state of switching and call processing hardware. For example, call processor 49 can receive a data package directly from switch 10 and autonomously deliver a particular calling service. Alternatively, switch 10 can send a data package to SCP 24, which then directs a data package to call processor 49 requesting a call processing resource. Because of the module servers and configurable SLT 56, call processor 49 can adapt to a variety of data packages received from a variety of switching and call processing hardware.

Figure 4:
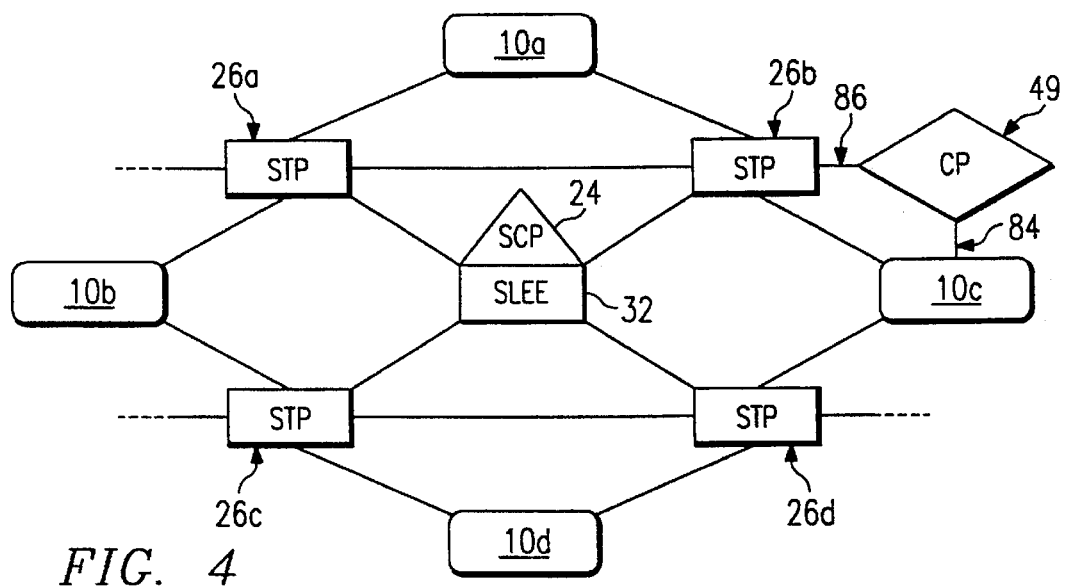
FIG. 4 is a block diagram of a telecommunications network equipped with a call processor constructed according to the teachings of the present invention.

Now referring to FIG. 4, a telecommunications network comprises switches 10a–10d connected to a distributed local or nationwide SS7 network through signal transfer points 26a–26d. The SS7 network allows data packages to be passed among the elements of the telecommunications network. The SS7 network is arranged to provide redundant pathways in the event of an STP or data link failure. For example, switch 10b may normally pass a data package to switch 10c through STP 26a and STP 26b. If, however, STP 26b malfunctions, switch 10b can reroute the data package through STP 26c and STP 26d. SCP 24 equipped with SLEE 32 also connects to the SS7 network in redundancy through STPs 26a–26d. In this embodiment SCP 24 provides call processing services for switches 10a–10d.

An exemplary call processor 49 services switch 10c through voice and data link 84. In this manner call processor 49 can act as an autonomous service node and provide calling services such as voice mail to callers patched through switch 10c. Data link 86 connects call processor 49 to the SS7 data network and allows call processor 49 to provide call processing resources to SCP 24. For example, SCP 24 sends a data package through STP 26b to call processor 49 requesting a text-to-voice announcement to a caller patched through switch 10c. Call processor 49 provides the resource and routes a data package back to SCP 24 through STP 26b signifying completion of the task. SCP 24 can also send a data package through STP 26b requesting call processor 49 to deliver voice mail services to a caller patched through switch 10c. Data packages may be sent over any of the data links 44, 45, 46, or 47. Call processor 49 can also provide redundant resource provisioning over the SS7 data network to a variety of telecommunications hardware. Therefore, the architecture of FIG. 4 supports the dual functions of call processor 49 as an SN and an IP.

Figure 5:
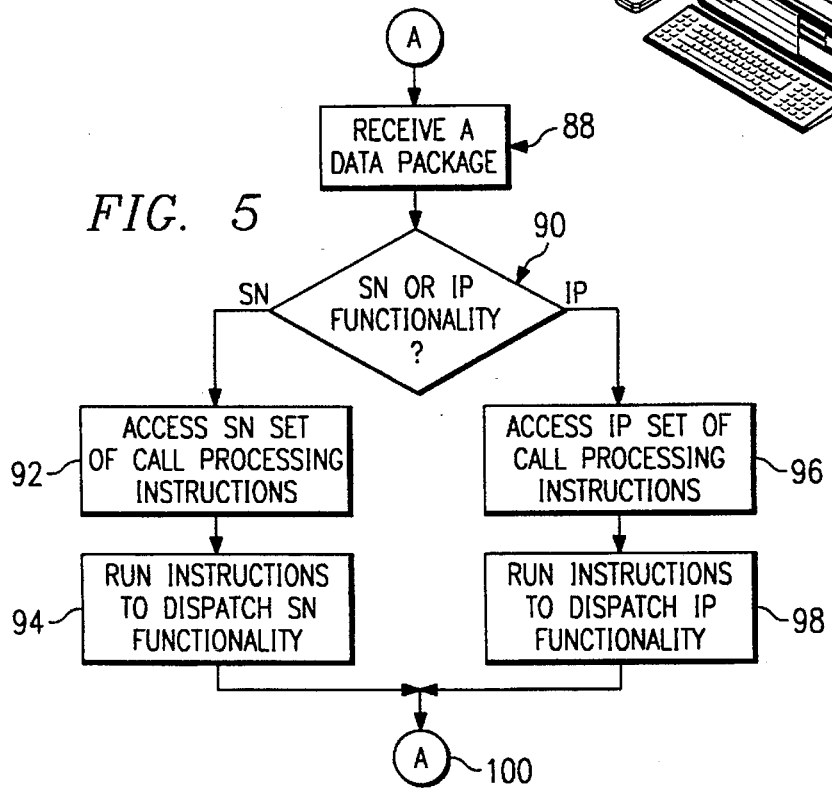
FIG. 5 is a flow diagram of the operation of a call processor constructed according to the teachings of the present invention.

FIG. 5 is a flow diagram illustrating the dual operation of call processor 49 as an SN and an IP. Call processor 49 receives a data package at step 88. As described above, the data package may come from a variety of sources over a variety of data communications links. Furthermore, the data package can represent a feature request or response, a resource request or response, a query request or response, or any other communication of data between devices in a call processing environment.

Call processor then decides at step 90 whether the received data package requires SN or IP functionality. If SN functionality is required, call processor 49 proceeds to step 92 and accesses the appropriate SN set of call processing instructions to perform the task. Call processor 49 then proceeds to step 94 and runs the call processing instructions to dispatch the SN functionality. The process is terminated at step 100 where call processor 49 may generate another data package to be sent to another device, such as the originator of the received data package.

If IP functionality is required, call processor 49 accesses the desired IP set of call processing instructions at step 96. Call processor 49 then proceeds to step 98 where the call processing instructions are executed to dispatch the IP functionality. The processing is concluded at step 100, where call processor 49 may generate a second data package to be sent to another device, such as the originator of the received data package. Therefore, FIG. 5 illustrates the dual operation of call processor 49 to dispatch both SN and IP functionality.

Call processor 49 offers flexible and inexpensive call processing, compatibility with current AIN architecture, and simple upgrading and reconfiguring to provide more calling services in the future. This design can deliver calling services autonomously or operate in slave mode and deliver call processing resources to an SCP. In addition, by using configurable and modular components, call processor 49 can be easily integrated into a variety of call processing hardware.

There have been described certain embodiments of a call processor to deliver calling services in accordance with the present invention. While these embodiments have been described and disclosed, other changes, substitutions, or alterations can be made without departing from the spirit and scope of the invention, as described in the appended claims.

What is claimed is:

1. A call processor operable to deliver calling services to callers, comprising:

a service creation environment for generating call processing instructions;

a memory accessible by the service creation environment, the memory storing the call processing instructions;

a central processor including a service logic executive with access to the call processing instructions stored in the memory;

a communications link allowing transmission of a data package from a service control point to the call processor, the data package indicating a call type and wherein the service logic executive executes the call processing instructions in response to receipt of the data package by the call processor : and wherein the call processor provides call processing resources to the service. control point or delivers a calling service independent of the service control point based upon the call type indicated by the data package.

2. The call processor of claim 1, in which the data package is transmitted to the call processor in response to a query from the call processor.

3. The call processor of claim 1, wherein the service creation environment allows manipulation of vectors, objects, and events to construct the call processing instructions.

4. The call processor of claim 1, wherein the service creation environment comprises a graphical interface that allows manipulation of vectors, objects, and events to construct a visual representation of the call processing instructions.

5. The call processor of claim 1, wherein the service creation environment allows modification of the call processing instructions without interruption of service by the call processor and without modification of the service logic executive.

6. The call processor of claim 1, wherein the call processing instructions are stored in a service logic table.

7. The call processor of claim 1, further comprising:
a second communications link allowing transmission of a second data package from a telecommunications switch to the call processor, the second data package indicating first or second call functionality and wherein the service logic executive executes call processing instructions in response to receipt of the second data package by the call processor and wherein the call processor provides first or second call functionality based upon the indication of the second data package.

8. The call processor of claim 7, in which the data package is transmitted to the call processor in response to a query from the call processor.

9. A call processing system operable to deliver calling services to callers, comprising:
a service creation environment for generating call processing instruction sets;
a memory accessible by the service creation environment, the memory storing at least first and second instruction sets, the first call processing instruction set operable to deliver calling services by providing call processing resources to a service control point, the second call processing instruction set operable to deliver calling services independently of the service control point;
a communications link allowing the transmission of a data package from a telecommunications switch to a central processor, the central processor including a service logic executive with access to the memory and operable, responsive to receipt by the central processor of a transmitted data package, to execute call processing instructions in one of the first and second sets thereof.

10. The call processing system of claim 9, wherein the service creation environment allows manipulation of vectors, objects, and events to construct the call processing instruction sets.

11. The call processing system of claim 9, wherein the service creation environment comprises a graphical interface that allows manipulation of vectors, objects, and events to construct a visual representation of the call processing instructions.

12. The call processing system of claim 9, wherein the service creation environment allows modification of the call processing instruction sets without interruption of service by the call processor and without modification of the service logic executive.

13. The call processing system of claim 9, wherein the call processing instruction sets are stored in a service logic table.

14. The call processing system of claim 13, wherein the memory stores a plurality of service logic tables.

15. A method of delivering calling services to callers, the method comprising the steps of:
receiving first and second call processing instruction sets at a central processor, the first call processing instruction set operable to deliver said calling services by providing call processing resources to a service control point, the second call processing instruction set operable to deliver said calling services independently of the service control point;
transmitting a data package from a telecommunications switch to the central processor; and
responsive to receipt of said data package, disposing the central processor to execute call processing instructions in one of the first and second sets thereof.

16. The method of claim 15, further comprising the step of manipulating vectors, objects, and events in a service creation environment to construct the call processing instruction sets.

17. The method of claim 16, further comprising the step of graphically displaying the vectors, objects, and events to create a visual representation of the call processing instruction sets.

18. The method of claim 15, further comprising the step of: storing the first and second call processing instruction sets in a memory.

19. The method of claim 15, wherein the call processing instruction sets are stored in a service logic table.

20. A call processor operable to deliver calling services to callers, comprising:
means for storing first and second call processing instruction sets, the first call processing instruction set operable to provide call processing resources to an external device and the second call processing instruction set operable to independently deliver a calling service;
means for interfacing with the external device for receiving a data package therefrom; and
means, responsive to receiving said data package, for executing one of the call processing instruction sets.

21. The call processor of claim 20, wherein fie external device comprises a service control point.

22. The call processor of claim 20, wherein the external device comprises a telecommunications switch.

23. The call processor of claim 20, wherein the means for interfacing comprises a communications link operating according to Transmission Control Protocol/Internet Protocol (TCP/IP) data transmission standards.

24. The call processor of claim 20, wherein the data package is sent from a service control point and routed through a telecommunications switch.

25. The call processor of claim 20, further comprising:
means for graphically manipulating vectors, objects, and events to construct a visual representation of the call processing instruction sets.

26. The call processor of claim 20, further comprising:
means for modifying the call processing instruction sets without interruption of service by the call processor and without modification of the service logic executive.

27. The call processor of claim 20, wherein the call processing instruction sets are stored in at least one service logic table.

* * * * *